No. 632,192. Patented Aug. 29, 1899.
A. MILLS.
FEED CUTTER.
(Application filed June 4, 1898.)
(No Model.)

Witnesses
Jos. H. Blackwood
Hartwell P. Heath

Inventor
Aubry Mills
by D. A. Gour___
Attorney

UNITED STATES PATENT OFFICE.

AUBREY MILLS, OF CLARK'S FORK, MISSOURI.

FEED-CUTTER.

SPECIFICATION forming part of Letters Patent No. 632,192, dated August 29, 1899.

Application filed June 4, 1898. Serial No. 682,611. (No model.)

*To all whom it may concern:*

Be it known that I, AUBREY MILLS, a citizen of the United States, residing at Clark's Fork, in the county of Cooper and State of Missouri, have invented certain new and useful Improvements in Feed-Cutters, of which the following is a specification.

My invention relates to improvements in feed-cutters, and especially those having a reciprocating knife movement, and has for its object to provide a simple, strong, cheap, easily made and operated self-feeding cutter to chop or cut up ears of corn, so that stock may more readily masticate and assimilate it, cob as well as grains. This object I accomplish in the manner and by the means hereinafter fully described in detail and particularly pointed out in the claim, reference being had to the accompanying drawings, in which like figures indicate like parts in all the views.

Figure 1:
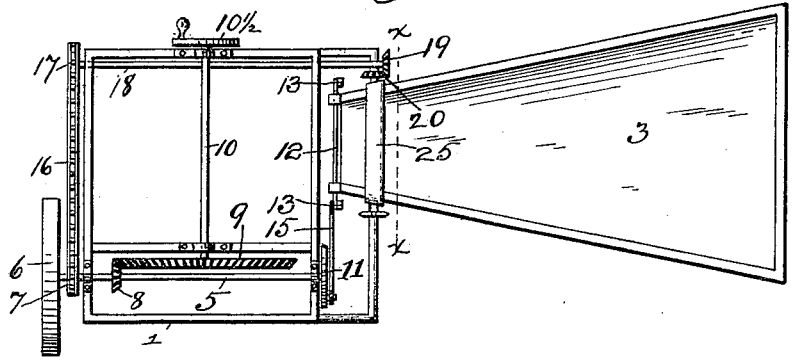
Figure 2:
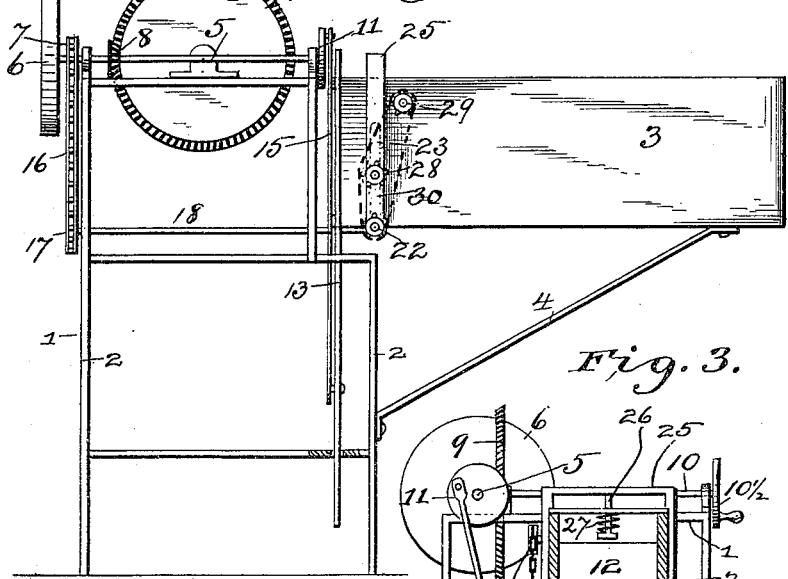
Figure 3:
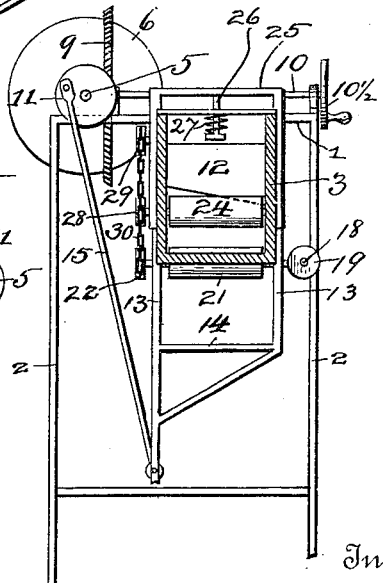
Figure 4:
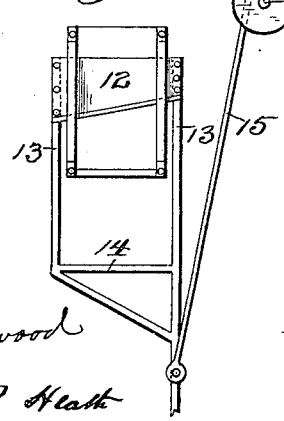

Figure 1 is a top plan view of my invention. Fig. 2 is a side elevation of my invention. Fig. 3 is a front elevation of same with part of box broken away. Fig. 4 is a detail view of knife and attachment.

My invention consists of a frame 1, supported on four legs 2 and having a feed-box 3 attached to it on one side, said feed-box 3 being supported by the braces 4. Across the frame 1 at one side, parallel to the feed-box 3, is a shaft 5, journaled to the frame 1. The shaft 5 has on the end farthest from the feed-box 3 a fly-wheel 6, and between the fly-wheel 6 and outside the frame 1 a sprocket-wheel 7 is mounted on the shaft 5. On the shaft 5, between its bearings, is mounted a small cog-wheel 8, which meshes with a large cog-wheel 9, carried by a shaft 10, journaled on and extending across the frame 1 at right angles to the shaft 5, said shaft 10 being provided at its end farthest from the shaft 5 with a crank-handle or driving-wheel, as hand or steam power is to be used. On the end of the shaft 5 nearest the feed-box 3 and outside the frame 1 a crank-wheel 11 is mounted. A knife 12, having a diagonal edge, is securely fastened to the upper part of two rods 13 and is slidably mounted on each side of the opening of the feed-box 3 into the frame 1. The rods extend below the mouth of said feed-box 3 and are firmly connected by cross-pieces 14. A pitman 15 is connected at one end to the crank-wheel 11 and at the other end to the lower part of the rod 13 on that side of the feed-box 3. A chain 16 connects the sprocket-wheel 7 on the main shaft 5 with a sprocket-wheel 17 on the end of a shaft 18, which is journaled in and extends across the frame 1 under and parallel with the main shaft 5, and which shaft 18 is provided at its end nearest the feed-box 3 with a beveled cog-wheel 19, which meshes with a cog-wheel 20 on one end of the lower feed-roller shaft 21. Just behind the knife 12 and across and near the bottom of the feed-box 3 the lower feed-roller 21 has its shaft journaled in the sides of the feed-box 3 and on one end the cog-wheel 20 and on the other end the sprocket-wheel 22. Just over the ends of the shaft of the lower feed-roller 21 two vertical slots 23 are cut in the sides of the feed-box 3, and through these slots 23 the ends of the shaft of the upper feed-roller 24 project and move up and down in the slots 23. A clevis-shaped frame 25 is placed over the end of the feed-box 3, just behind the knife 12, its ends extending down to and having the ends of the shaft of the upper feed-roller 24 journaled in them. In the top of the clevis-shaped frame 25 a rod 26 is secured, which extends down into the feed-box 3, which at this point is covered, and between the end of the rod 26 and the cover of the feed-box 3 a coiled spring 27 is placed. A sprocket-wheel 28 is placed on the end of the shaft of the upper feed-roller 24 just above the sprocket-wheel 22 on the end of the shaft of the lower feed-roller 21 and between the sprocket-wheel 22 and a sprocket-wheel 29, mounted on a pintle fixed in the side of the feed-box 3. A chain 30 connects the three sprocket-wheels 22, 28, and 29 and permits the sprocket-wheel 28 to move up and down.

The operation of my invention is as follows: The ears of corn being placed in the feed-box 3, the shaft 10 is made to revolve by a crank, if by hand, or a drive-wheel, if by other power, fixed on its end. The cog-wheel 9 then turns the cog-wheel 8 and the main shaft 5 in a right-hand direction, causing the crank-wheel 11, with the pitman 15, to turn and move the rods 13, carrying the knife 12, up and down. At the same time the chain 16 communicates the motion from the sprocket-wheel 7 to the sprocket-wheel 17 through the shaft 18 and cog-wheel 19 to the lower feed-roller 21, which, by means of the sprocket-wheel 22 on its other end, the chain 30, and sprocket-wheels 28 and 29, turns the upper feed-roller 24 and feeds the ears of corn to the knife 12.

Having thus described my invention, what I claim as new, and desire to secure by Letters Patent, is—

A feed-cutter consisting of a frame, a feed-box, a shaft journaled on said frame, and provided with a fly-wheel and a crank-wheel at its ends, a small cog-wheel intermediate its bearings and a sprocket-wheel outside said frame, a driving-shaft carrying a cog-wheel meshing with said small cog-wheel and provided with a crank-handle, a knife with edge placed diagonally secured to two rods slidably mounted at the mouth of said feed-box and joined beneath said mouth, a pitman connecting the lower ends of said rods and said crank-wheel, a shaft carrying a sprocket-wheel and a beveled cog-wheel, a feed-roll provided with a sprocket-wheel and with a cog-wheel meshing with said beveled cog-wheel a vertically-spring-controlled frame astride said feed-box, an upper feed-roll passing through vertical slots in the side of said feed-box and journaled in the ends of said spring-controlled frame, said roll provided with a sprocket-wheel, a sprocket-wheel mounted on a pintle fixed in the side of said feed-box above said upper roll and a chain connecting said three sprocket-wheels, substantially as shown and described.

In testimony whereof I hereto affix my signature in the presence of two witnesses.

AUBREY MILLS.

Witnesses:
D. T. DRAFFEN,
J. K. RUTHERFORD.